Nov. 14, 1939.  A. G. HILLMAN  2,179,630
INTERMITTENT FEED MECHANISM
Filed Aug. 25, 1937   4 Sheets-Sheet 1
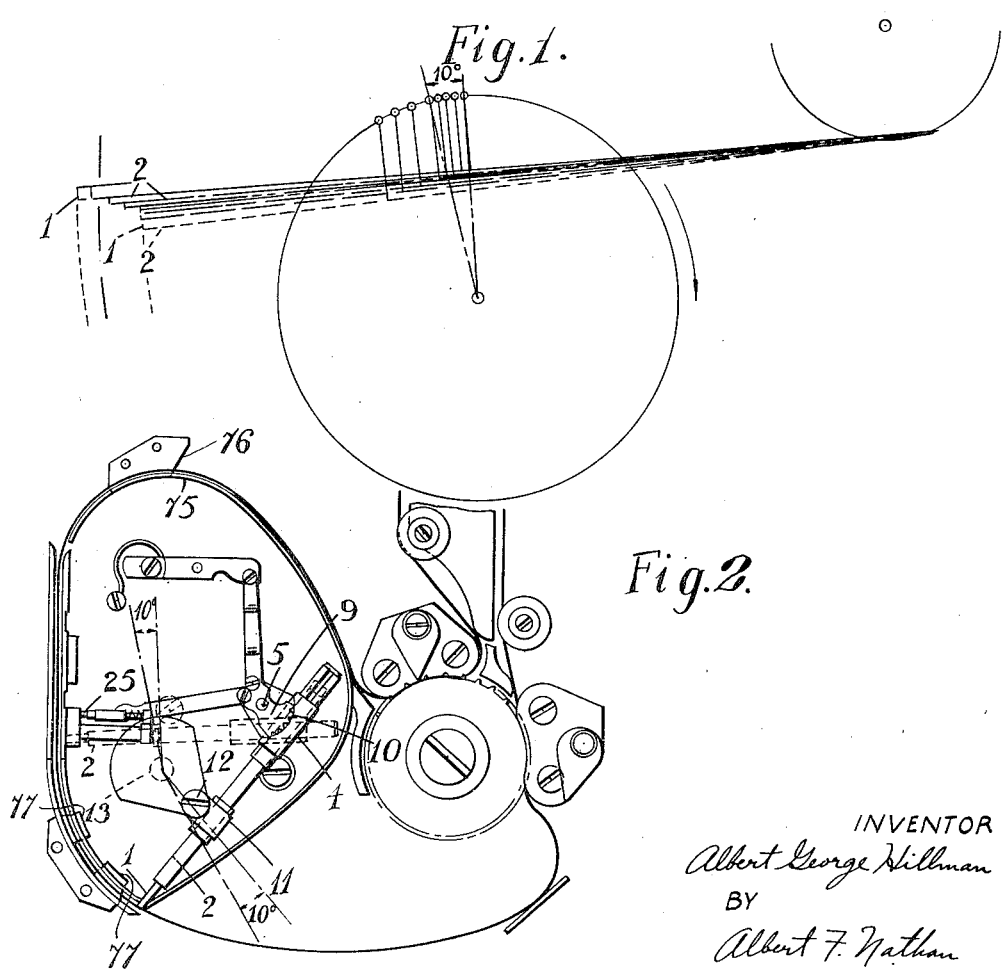
INVENTOR
Albert George Hillman
BY
Albert F. Nathan
ATTORNEY.

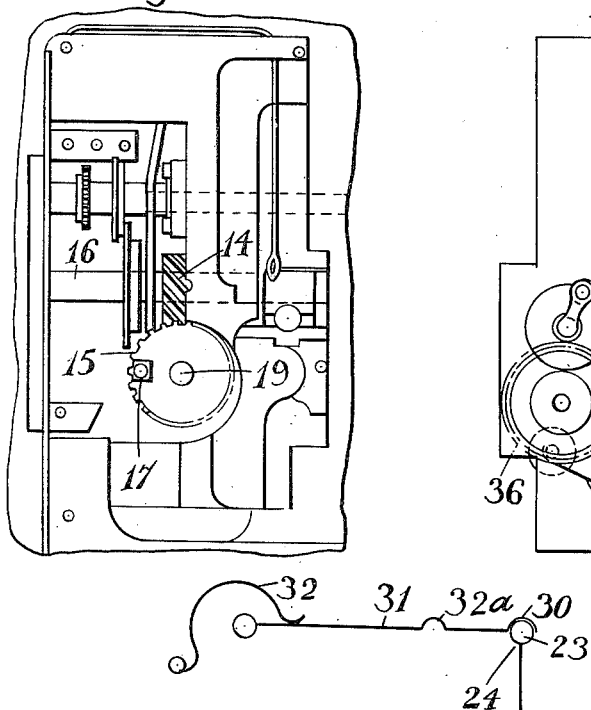

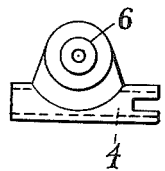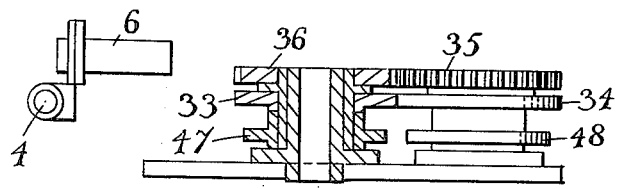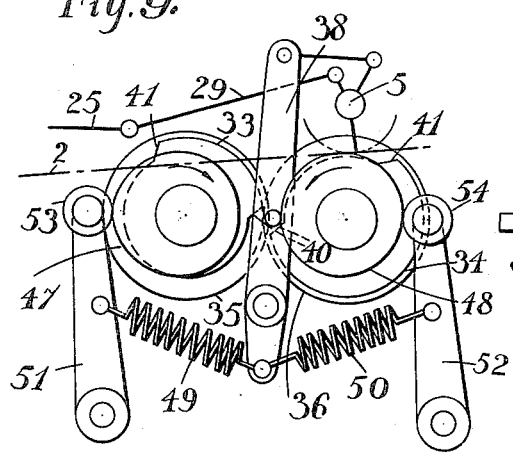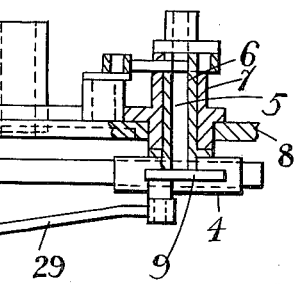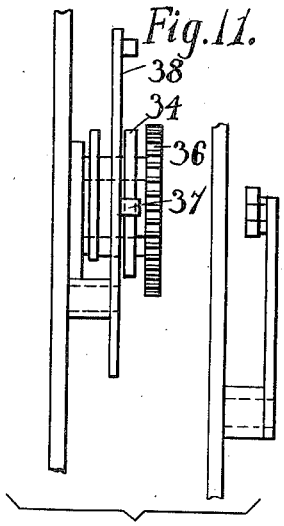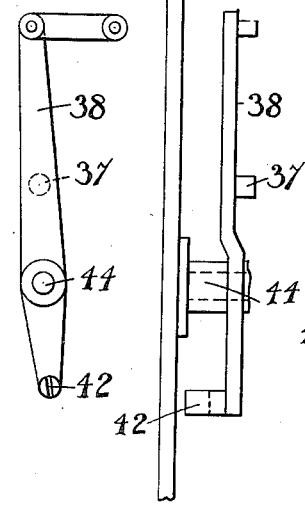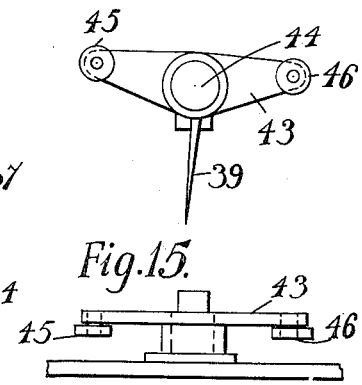

Nov. 14, 1939.  A. G. HILLMAN  2,179,630
INTERMITTENT FEED MECHANISM
Filed Aug. 25, 1937  4 Sheets-Sheet 4
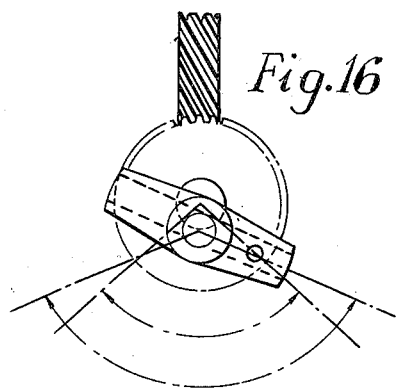
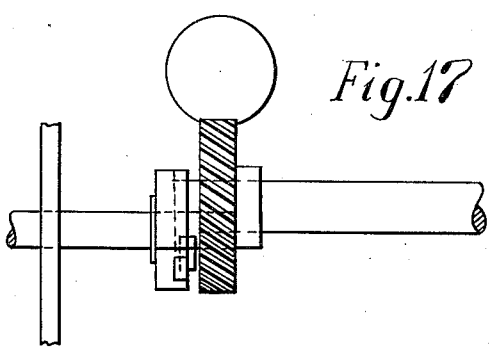
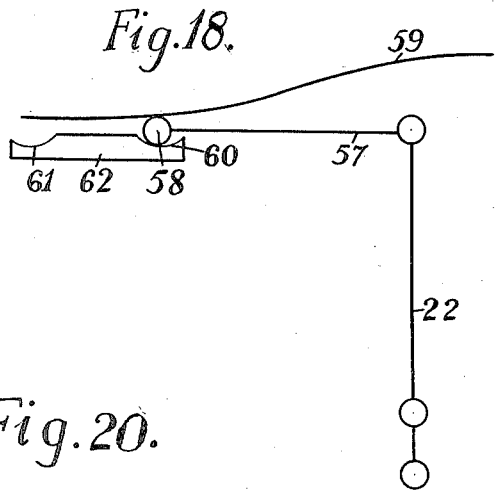
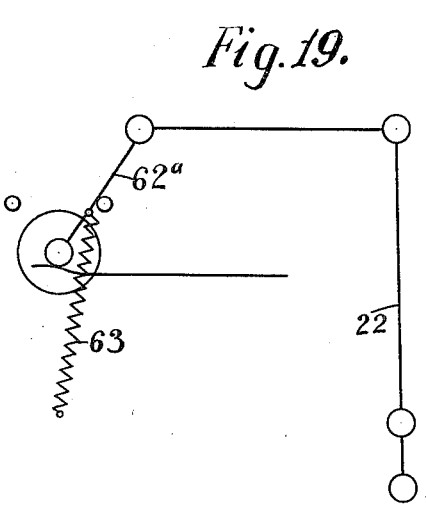
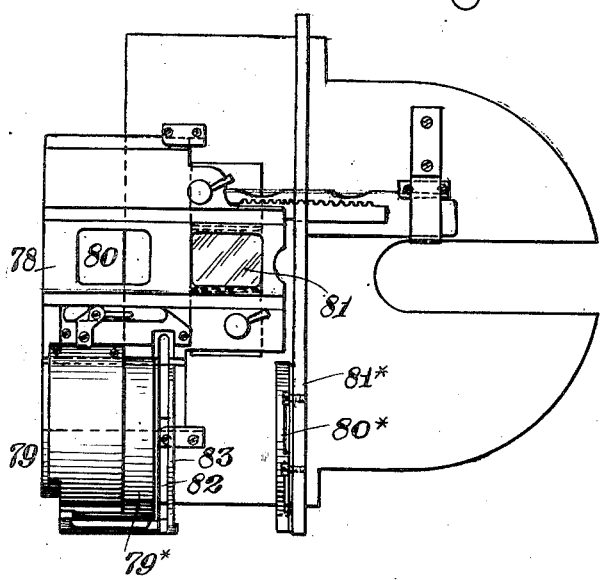
INVENTOR
Albert George Hillman
BY
Albert F. Nathan
ATTORNEY.

Patented Nov. 14, 1939

2,179,630

UNITED STATES PATENT OFFICE 2,179,630

INTERMITTENT FEED MECHANISM

Albert George Hillman, Maidenhead, England

Application August 25, 1937, Serial No. 160,896
In Great Britain August 28, 1936

16 Claims. (Cl. 88—18.4)

The present invention relates to improvements in intermittent feed mechanisms, particularly for use in cinematograph cameras though also applicable to projectors and printing machines, of the kind in which the film is moved intermittently by a tooth or teeth or claw or claws (hereinafter termed tooth) mechanically inserted and withdrawn, the tooth being withdrawn, and held from the film during the return motion of the tooth which corresponds to the stationary interval.

In modern cameras employing such mechanism, there is a curved track provided below the picture frame for the film and the tooth is carried at the end of a pivoted rod or frame operating over the curved portion of the track, hereinafter termed the rod or tooth member, which is given a rocking movement by a crank-operated slider. Near the end of each rise and fall movement caused by the crank action, the pivoted end of the tooth member is moved on an arc towards or away from the film, thus producing a movement in the opposite direction of the tooth end of the said member about the crank pin.

In some cases, and more particularly where the film has to be moved a plurality of picture spaces at each pull, the aforesaid method is apt to cause rubbing on the film both during the entry and withdrawal of the tooth member and during the movement of the film, and also to cause some movement of the film during the times of entry and/or withdrawal of the tooth.

The present invention provides however that not only is the advance of the tooth member towards the film perforations made a rectilinear one or substantially a rectilinear one, but provision is made for effecting a very quick movement of the tooth member which is timed to take place over the angular movement of the crank during which the rise or fall of the tooth member is substantially negligible.

To this end, the intermittent film-feed mechanism according to the present invention comprises a film-engaging tooth member operated by an orbitally moving slide and spring means for periodically imparting to the tooth member rectilinear movements with respect to the slide which are so controlled, and timed to occur so near to the end of the rising and falling movement of the slide, that the tooth member travels through the perforations in the film in a substantially straight path so as to prevent the tooth from displacing the film during the engaging or disengaging periods.

Another feature of the invention is that the tooth member during the shifting of the film follows a path substantially corresponding with the curvature of the track so that during the shift period there is no rubbing of the tooth on the edge of the perforation.

A further advantage is that owing to the shorter time occupied by the entry and withdrawal of the toothed member, a greater time is allowed for the actual movement of the film, or alternatively the number of shifts per second can be increased without increase of the strain on the film.

The spring (or springs) is energized during an appropriate part of the movement of the tooth member and is allowed under suitable cam control to give up its energy rapidly and cause a kick of the tooth member when the tooth is to be inserted into or withdrawn from the film.

In the preferred mechanism according to the invention the tooth member is in the form of a rod which is slidingly mounted in an orbitally moving slide and also in a rocking guide which is loosely mounted on a spindle, on which is a toothed sector engaging a rack on the tooth member, such sector being turned by means of the spring (or springs), through suitable intermediate connections, near the end of each rocking movement of the guide.

The movements of the tooth member with respect to its guide may be under cam control, there being conveniently two co-operating peripheral cams between which is arranged a cam follower carried by a lever which is moved by the aforesaid spring or springs and is arranged to rock the quadrant when a sharp fall away portion of one or other of the cams reaches the follower. A second pair of cams, conveniently mounted on the same shafts as the first pair, may be employed to energize the spring during the time between the sudden movements of the tooth member into and out of the film.

The tooth member may serve to couple its guide with the crank-slider, so that the guide receives its rocking motion through the tooth member.

It is preferred to use a blade spring, anchored at one end to a rocking arm which carries at each end a follower for the spring-energizing cams, and anchored at its other end to one end of the aforesaid quadrant-operating lever, but other methods may be adopted, such as by arranging each cam follower on a separate pivoted arm and coupling each pivoted arm to the lever by a helical spring.

For holding the film in position when the film-driving tooth is disengaged from the film, an additional film-engaging tooth member may be provided arranged to be given its insertion and withdrawal movements through the spring-actuated lever in timed relationship with the withdrawal and insertion respectively of the film-driving tooth. Provision may be included whereby the film-stop can be held out of the path of the film track whilst the film-driving tooth is also out of such path for the purpose of permitting the loading of the film into the camera, and allowing the film loop to be inserted laterally into the gate without obstruction.

In order that the present invention may be the more readily understood, reference is hereinafter made to the accompanying drawings which show two ways of carrying it into effect and certain variants of the details thereof.

Fig. 1 shows diagrammatically the method according to the present invention of shifting the film in a camera having a curved film track;

Fig. 2 is a side view of that part of the camera containing the intermittent mechanism and showing the film position at the termination of the shift period;

Fig. 3 is a view from the same aspect as Fig. 2, but showing the mounting plate for the intermittent mechanism removed for the purpose of illustrating the means from which the intermittent mechanism derives its drive from the main shaft;

Fig. 4 is a rear view of the mounting plate carrying the intermittent mechanism;

Figs. 5 and 6 are side and end views of the suspended guide for the tooth member;

Fig. 7 is an enlarged face view of the cam mechanism and Fig. 8 is a part section on a smaller scale through the cam shafts.

Fig. 9 is a side view of a variant form of cam and lever device;

Fig. 10 is a sectional plan through a part thereof, and Fig. 11 a side view thereof;

Figs. 12, 13, 14 and 15 are detail views;

Figs. 16 and 17 are views of the coupling for effecting intermittent accelerated movement of the tooth member;

Figs. 18 and 19 are diagrammatic views of two modified devices for keeping the film stop out of action for threading up the film;

Fig. 20 is a face view of the film track;

In the mechanism illustrated in the drawings, 1 is the film-engaging tooth and 2 a rod or frame which carries it.

The problem to be overcome is how to control the film engaging and/or disengaging movement of the tooth in such a manner that the tooth shall have an unobstructed entry and withdrawal to and from the film perforation and that undesirable friction effects of tooth against perforation edges and unwanted motions of the film are avoided or minimised.

I satisfactorily overcome this problem by making the rod, frame or carrier 2 for the tooth the recipient of a sudden rectilinear motion relative to the slide. This movement takes place during a very small part of the motion of the crank (for example that occurring during 10° of movement of the crank pin, as indicated in Fig. 2) when the tooth member is substantially tangential to the curve described by the centre of the crank pin. The tooth is therefore caused to follow a curved path susbtantially corresponding with that of the curved film track so that danger of unwanted movement of the film and/or rubbing of the tooth on the edge of the perforation of the film with which it for the time being is engaging is or are made negligible or minimised. The return path may also follow the curvature of the track and the amount of penetration of the tooth through the film can be so small that the tooth only just protrudes through the film.

In the form about to be described only a single film-driving tooth is used, so that its carrier will be hereinafter termed "the rod".

The rod 2 which at its free end carries the tooth 1 is mounted in a guide 4, which is free to rock in a vertical plane about a fixed horizontal axis 5. The slide-guide 4 is secured to a bushing 6 rotatably mounted in a bearing 7 carried by a mounting plate 8 of the camera. Figs. 6, 7 and 11 show these parts most clearly.

A spindle (Fig. 11), called 5 because it forms the fixed horizontal axis above referred to, is rotatably mounted in the bushing 6 and is made fast with a segmental gear 9 which meshes with a rack 10 formed on the rod.

The rod 2 is arranged also in a slider 11 which is pivotally suspended from a crank pin 12 (Fig. 3). The crank pin is on a shaft 13 which is connected for drive by a worm gear 14, 15 (Fig. 4) from the main driving shaft 16 of the camera.

When the rod 2 is being rocked it rolls around the teeth of the quadrant and the tip of the tooth describes an involute curve parallel to the correspondingly curved film track.

The drive from the main shaft 16 to the crank shaft 13 for this purpose may be effected through a variable speed coupling such that the rod is given an accelerated movement during the shifting of the film and a comparatively slow movement whilst the exposures are taking place. For this purpose, the worm wheel 15 (Fig. 4) driven from the worm 14 on the main shaft is connected to the shaft 13 by a loose coupling comprising a block or pad 17 rotatable about a pin on the wheel 15 and engaging a slotted arm 18 (Fig. 5) which is mounted on the crank shaft 13 which is located a little below the axis 19 of the worm-wheel shaft.

Connected to the segmental gear spindle is an arm 20 (Fig. 8) pivoted at 21 intermediately of a lever 22 which swings about a horizontal axis 23 formed by an upper fulcrumed end 24 which is capable of being shifted so as to make use of the lever for retracting the film stop 25 (hereinafter referred to) out of the track of the film in the gate.

The pivotal connection of the arm 20 of the segmental gear to the horizontally swinging lever 22 divides such lever into a long arm 26 extending to the swinging axis 21 and a short arm 28 extending to a link 29 connecting it with the film stop 25.

The swinging axis of such lever can be made adjustable by arranging it to work in a half-bearing 30 at the end of a pivoted arm 31 which is yieldingly urged by spring 32 against the bearing end of the lever and at a shorter distance from the pivot of such arm is arranged a recess 32a for locking the lever when turned to the position in which the film stop is retracted.

The lever 22 may be swung about axis 21 to release the film stop even when the claw tooth is released from the film; thereby enabling the film loop to be laterally inserted into the gate without obstruction.

The arrangement is such that as the segmental gear 9 is swung as hereinafter described to impart rectilinear movement to the rod, the film stop 25 is operated to withdraw it from or insert it in the film as the feeding tooth is operated to insert it in or withdraw it from the film.

Through the gear and rack drive 9 and 10 the rod 2 can be made the recipient of a rectilinear motion with respect to its guide for the purpose of engaging and disengaging the film.

This movement is arranged to take place while the rod is moving through so small a part of its vertical rocking movement that undesirable shifting back or on of the film and/or frictional reaction of the tooth and the edges of the perforations of the film is or are substantially avoided, despite the much greater angle of vertical rocking movement of the rod as compared with that which would take place in moving a film through a distance of one picture frame. It is convenient and advantageous for the engagement or disengagement of the tooth with the film to take place over not more than approximately the last ten degrees of the rising and falling movement of the crank pin, during which small angular displacement of the crank pin the tooth is being moved upwards or downwards as the result of only one motion, viz., that small rise or fall of the slider which corresponds to the smallness of the crank angle over which the engagement or disengagement of the tooth is effected. The aforesaid 10° includes the approach of the tooth towards the film before entry and clearance after withdrawal.

Now it will be seen that in order to drive the rod 2 and the film stop 25 the proper distance within the last 10° of the rising or falling movement of the crank pin the segmental gear 9 must be arranged to be rocked in the time that this 10° movement is taking place.

The movement has to take place so rapidly that if it were effected by a cam a danger would arise of smashing the cam follower and in any case a very hard mechanical action would result. In order to override this difficulty I effect the movements by the sudden release of energy stored in a spring or springs. I provide an edge by edge pair of peripheral cams 33, 34 (see Figs. 8 and 9) adapted to be rotated at equal speeds by a pair of gears 35, 36 the driver 35 of which is fast with the crank pin shaft 13.

The cams control motion in opposite directions of a follower 37 mounted on a lever 38, the movement of which in either direction is arranged to energise a spring 39 whereby the lever is quickly swung to one side or the other correspondingly to rock the segment when a sharp fall away part 40, 41 of the cam profile is moved past the follower, a movement which is arranged to correspond with the before mentioned last 10° rising or falling movement of the crank pin.

The lever is of the third class and the spring 39 in the form of a common blade spring one end of which is slidably mounted in a slot 42 in the end of the lever and the other end of which is firmly anchored to a rocking arm 43 which is mounted on the axis 44 of the lever 38 and whose opposite ends are provided with followers 45, 46 co-operating with appropriately profiled cams 47, 48 rotatable with the pair of gears hereinbefore referred to so that as the arm rocks from one side to the other of the longitudinal axis of the lever the spring is energised.

Or the lever may be provided with oppositely acting tension spiral springs 49, 50 (see Fig. 10) connected to levers 51, 52 of the second class having followers 53, 54 which co-operate with appropriately profiled cams 47, 48 on the said gearing.

Intermediately of the fall away of the lever follower from one direction to the other the profiles of the pair of co-operating cams are preferably arranged in such a manner as to confine the follower to a stationary position between them.

The withdrawal of the film stop to permit lateral insertion of the film in the gate is usually permitted by arranging the film stop to be retracted against a spring, a practice however which is liable to interfere with the efficient working of the stop for intermittently engaging the film to hold it steady in the gate. By the herein described means I provide for the retraction of the stop so that this and the film feeding tooth may be simultaneously withdrawn from the back of the film through the gate while retaining the advantage of movement of the stop in normal working which is positive with or completely dependent upon the movement of the rotating spindle wherefrom the rectilinear movement is imparted to the rod or frame which carries the film feeding tooth.

Other ways of retaining the horizontally swinging lever 22 in the position to which it is turned to retract the film stop may be adopted such as (see Fig. 19) by pivoting the horizontally swinging lever to a horizontal rod 57 having a wheeled, rollered or rounded end 58 arranged to be urged by a spring 59 in either of two spaced notches or recesses 60, 61 in a bar 62 corresponding to the working position of the film stop and its retracted position respectively. Or (see Fig. 20) such horizontal rod 22 may be arranged to be moved from one position to the other by a lever 62a arranged to be retained by a spring 63 in either of two corresponding positions, for example, by means of a spring acting on opposite sides of a dead centre line.

Fig. 3 also shows the position of the rod for inserting the film laterally into the gate. The curved guide 75 for the film is so proportioned and arranged that in the position shown the film nearly follows the curvature of the guide, but does not come into close contact therewith. During the stationary period of the film the film forms a loop above the guide whilst the film spans the lower part of the film track and the sprocket roller. By proportioning the guide 75 as shown, when the film is shifted it comes into the position shown in Fig. 3 without impact with the guide, so that sharp rebounds of the film which are liable to set dust particles in motion and mar the film surface are avoided.

The shifting of the film by a single tooth is liable to cause canting of the film, and to obviate or minimise this tendency, one film edge is arranged to bear against smooth-faced metal pads 76 and 77 (see Fig. 3).

The gate 78 and film track 79 may be transversely slidable along guides so that one of the gate apertures, viz., 80, may be slidden to one side and replaced by a ground focussing glass window 81 for direct view vision. The curved part of the film track is divided, one part 79× being movable with the gate and the other part 80× being fixed to the panel 81× upon which the intermittent mechanism is mounted. The gate is shown slidden to the left to bring the ground glass window into the line of the film. The movable part 79 is slotted at 82 to receive the tooth member and in the normal position of the film track the bar 83 to the right of the slot lies below the curved fixed part 80 so that when the claw is withdrawn from the film the track can be moved laterally without the bar coming into contact with the claw and damaging it.

Although the invention has been described more particularly for multiple picture shift mechanism, the mechanism according to the invention may also be used advantageously with a single picture shift.

What I claim is:

1. An intermittent film-feed mechanism comprising a film-track, a member having a film-feeding tooth for pulling the film along said track, means pivotally supporting said member in such a manner as to permit said member to be moved towards and away from said track, a slide movable along said member, means for moving said slide in an orbital path so as to cause said slide to rock said member, spring means for periodically imparting to the member sudden rectilinear movements with respect to the slide towards and away from the said track so as to enter the tooth into and withdraw it from the film and means for timing said movements to occur at predetermined positions of said slide so as to effect a rapid substantially straight travel of the tooth through the film without displacing the latter.

2. An intermittent film-feed mechanism comprising a film-track, a member having a film-feeding tooth for pulling the film along said track through a distance of a plurality of picture frames at each pull, means pivotally supporting said member in such a manner as to permit said member to be moved towards and away from said track, a slide movable along said member, means for moving said slide in an orbital path so as to cause said slide to oscillate said member, spring means for periodically imparting to the member sudden rectilinear movements with respect to the slide towards and away from the said track so as to enter the tooth into and withdraw it from the film, means for energising such spring means between entry and withdrawal of the tooth so that the spring means can act first in one direction to enter the tooth and then in another direction to withdraw the tooth and means controlling the release of the energy stored in the spring means so that at predetermined positions of the said slide the energy of the spring means is suddenly released so as to effect a rapid substantially straight travel of the tooth through the film without displacing the latter.

3. An intermittent film-feed mechanism comprising a film-track, a member having a film-feeding tooth for pulling the film along said track, means pivotally supporting said member in such a manner as to permit said member to be moved towards and away from said track and to constrain the tip of the tooth to follow a path parallel to the film track during the shift, a slide movable along said member, means for moving said slide in an orbital path so as to cause said slide to oscillate said member, spring means for periodically imparting to the member sudden rectilinear movements with respect to the slide towards and away from the said track so as to enter the tooth into and withdraw it from the film, means for energising such spring means between entry and withdrawal of the tooth so that the spring means can act first in one direction to enter the tooth and then in another direction to withdraw the tooth and means controlling the release of the energy stored in the spring means so that at predetermined positions of the said slide the energy of the spring means is suddenly released so as to effect a rapid substantially straight travel of the tooth through the film without displacing the latter.

4. An intermittent film-feed mechanism comprising a film-track, a member having a film-feeding tooth adapted to pull the film along said track, means pivotally supporting said member in such a manner as to permit said member to be moved towards and away from said track, a slide movable along said member, means for moving said slide in an orbital path so as to cause said slide to rock said member and enable the tooth to feed the film, a guide, a spindle about which said guide is adapted to be rocked as the orbitally moving slide rocks the member, spring means for periodically imparting to the member sudden rectilinear movements with respect to the slide towards and away from the said track so as to enter the tooth into and withdraw it from the film without displacing the film, means for periodically re-energizing said spring means and means for timing said movements to occur at predetermined positions of said slide so as to effect a rapid substantially straight travel of the tooth through the film without displacing the latter.

5. An intermittent film-feed mechanism comprising a film-track, a member having a film-feeding tooth for pulling the film along said track, a rack carried by said member, means pivotally supporting said member in such a manner as to permit said member to be moved towards and away from said track, a slide movable along said member, means for moving said slide in an orbital path so as to cause said slide to rock said member to enable the tooth to shift the film, a guide along which said member is slidable, a spindle about which said guide is adapted to be rocked as the orbitally moving slide rocks the member, a toothed sector on said spindle adapted to engage said rack, spring means for periodically imparting to the toothed sector sudden swinging movements which in turn impart rectilinear movements to the member with respect to the slide towards and away from the said track so as to enter the tooth into and withdraw it from the film and means for timing said swinging movements to occur at predetermined positions of said slide so as to effect a rapid substantially straight travel of the tooth through the film without displacing the latter.

6. An intermittent film-feed mechanism comprising a film-track, a member having a film-feeding tooth for pulling the film along said track, means pivotally supporting said member in such a manner as to permit said member to be moved towards and away from said track, a slide movable along said member, means for moving said slide in an orbital path so as to cause said slide to oscillate said member, spring means for periodically imparting to the member sudden rectilinear movements with respect to the slide towards and away from the said track so as to enter the tooth into and withdraw it from the film, means for re-energising such spring means after each of such movements so that the spring means can act first in one direction to enter the tooth and then in another direction to withdraw the tooth and cam means controlling the release of the energy stored in the spring means and the timing of such movements at predetermined positions of the said slide so that the energy of the spring means is suddenly released and causes a rapid substantially straight travel of the tooth through the film without displacing the latter.

7. An intermittent film-feed mechanism comprising a film-track, a member having a film-feeding tooth for pulling the film along said track, means pivotally supporting said member in such a manner as to permit said member to be moved towards and away from said track, a slide movable along said member, means for moving said slide in an orbital path so as to cause said slide to rock said member, a pair of peripheral cams having sharp fall-away portions, means to drive said cams, a lever having a follower cooperating with said cams, said lever being operatively connected to said member, spring means for suddenly rocking said lever and follower when said fall away portions reach the follower and in timed relationship to the movement of the slide, means for periodically re-energising said spring means, the movements of said lever causing rapid rectilinear movements of the said member towards and away from said track so that the tooth travels through the perforation in the film in a substantially straight path and does not displace the film during the engaging and disengaging periods.

8. An intermittent film-feed mechanism comprising a film-track, a member having a film-feeding tooth for pulling the film along said track, means pivotally supporting said member in such a manner as to permit said member to be moved towards and away from said track, a slide movable along said member, means for moving said slide in an orbital path so as to cause said slide to rock said member, spring means for periodically imparting to the member sudden rectilinear movements with respect to the slide towards and away from the said track so as to enter the tooth into and withdraw it from the film, cam means for energising said spring means, means for driving said cam means so that such cam means energise the spring means after each film engaging or disengaging movement of the tooth so that the spring means are ready to effect the next disengaging or engaging movement of the tooth, and means for timing the rapid spring-effected movements of the said member in such relationship to the movements of the slide that the tooth travels through the perforations in the film in a substantially straight path and does not displace the film during the engaging and disengaging periods.

9. An intermittent film-feed mechanism comprising a film-track, a member having a film-feeding tooth for pulling the film along said track, means pivotally supporting said member in such a manner as to permit said member to be moved towards and away from said track, a slide movable along said member, means for moving said slide in an orbital path so as to cause said slide to rock said member, spring means for periodically imparting to the member sudden rectilinear movements with respect to the slide towards and away from the said track so as to enter the tooth into and withdraw it from the film, at least one cam, means for driving said cam, and at least one rocking arm carrying a follower of said cam, said spring means being carried by said arm so that as the said cam moves it moves said follower in order to rock the arm and energise the spring means, means which cause said spring means to retain their energy until the slide reaches predetermined positions and then permit the spring means to impart sudden movements to said member so that the tooth travels through the perforations in the film in a substantially straight path and does not displace the film during the engaging and disengaging movements.

10. An intermittent film-feed mechanism according to claim 7, comprising additional cams which act as spring-energising means, means for driving said cams, and at least one rocking arm carrying at least one follower of either of said cams, spring means carried between said arm and said lever so that as each spring-energising cam moves, it moves its follower in order to rock the arm with respect to said lever and energise the spring means, said spring means rocking the lever when the fall away portions of the first mentioned cams reach the follower on said lever.

11. An intermittent film-feed mechanism comprising a film track, a member having a film-feeding tooth and a mount for said member, said member being movable relatively to said mount towards said track to engage the tooth with the film and away from said track to withdraw the tooth from the film, means for moving said member with reference to its mount to travel said tooth along the track and feed the film, a pair of peripheral cams having sharp fall-away portions, means to drive said cams, a lever having a follower co-operating with said cams, said lever being operatively connected to said member for imparting to said member its said movements to engage the tooth with and disengage it from the film, spring means for suddenly rocking said lever and follower when said fall-away portions reach the follower and in timed relationship to the movement of the said means for travelling the tooth along the track so that said film-engaging and film disengaging movements of the tooth take place rapidly in a substantially straight path, cams for energising said spring means, said spring-energising cams being rotatable on the same axis as said first mentioned cams, means for driving said spring-energising cams, and at least one rocking arm carrying at least one follower of one of said spring-energising cams, said spring means being carried between said arm and said lever so that as each spring energising cam moves, it moves its follower in order to rock the arm relatively to said lever and energise the spring means.

12. An intermittent film-feed mechanism comprising a film track, a member having a film-feeding tooth and a mount for said member, said member being movable relatively to said mount towards said track to engage the tooth with the film and away from said track to withdraw the tooth from the film, means for moving said member with reference to its mount to travel said tooth along the track and feed the film, spring means for periodically imparting to said member sudden rectilinear movements for so engaging and withdrawing the tooth, means for periodically energising said spring means and means for controlling the sudden release of energy stored in the spring means in timed relationship to the movement of said means for moving the tooth along the track so that the spring means cause the tooth to travel rapidly through the perforation in the film in a substantially straight path without displacing the film during the engaging and disengaging periods.

13. An intermittent film-feed mechanism comprising a film track, a member having a film-feeding tooth and a mount for said member, said member being movable relatively to said mount towards said track to engage the tooth with the film and away from said track to withdraw the tooth from the film, means for moving said member with reference to its mount to travel said tooth along the track and feed the film, a pair of peripheral cams having sharp fall-away portions, means to drive said cams, a lever having a follower co-operating with said cams, said lever being operatively connected to said tooth-member, spring means for suddenly rocking said lever and follower when said fall away portions reach the follower and in timed relationship to the movement of the said means for moving the tooth member, spring-energising cams, means for driving said spring-energising cams, a rocking arm carrying followers of said spring-energising cams, said spring means being in the form of a blade spring connected to said rocking-arm and to said lever, the cams serving to rock the arm first in one direction to energise the spring for effecting the movement of the lever in one direction and then to rock the arm in the opposite direction to energise the spring so that it will rock the lever in the reverse direction, the sudden rocking movements of said lever causing rapid rectilinear movements of the tooth member for engaging the tooth with and withdrawing it from the film so that the tooth travels through the perforation in the film in a substantially straight path and does not displace the film during the engaging and disengaging periods.

14. An intermittent film-feed mechanism comprising a film track, a member having a film-feeding tooth and a mount for said member, said member being movable relatively to said mount towards said track to engage the tooth with the film and away from said track to withdraw the tooth from the film, means for moving said member with reference to its mount to travel said tooth along the track and feed the film, spring means for periodically rapidly effecting the movements of the tooth member to engage and withdraw said tooth with and from the film, a pair of peripheral cams having sharp fall-away portions, means to drive said cams, a lever having a follower co-operating with said cams, said lever being operatively connected to said tooth member, said spring means suddenly rocking said lever and follower when said fall away portions reach the follower and in time relationship to the movement of the said means for moving the tooth member, spring-energising cams, means for driving said cams, rocking arms each carrying a follower of one of said spring-energising cams, said spring means being in the form of helical springs, each of such springs being connected to a corresponding one of said rocking arms and to the said lever, the spring-energising cams serving to rock first one of said rocking arms and then the other for the purpose of energising the springs in such a manner that they alternately come into action to turn the lever in opposite directions, the movements of said lever causing said rapid movements of the tooth member to take place rectilinearly so that the tooth travels through the perforation in the film in a substantially straight path and does not displace the film during the engaging and disengaging periods.

15. An intermittent film-feed mechanism comprising a film track, a member having a film-feeding tooth and a mount for said member, said member being movable relatively to said mount towards said track to engage the tooth with the film and away from said track to withdraw the tooth from the film, means for moving said member with reference to its mount to travel said tooth along the track and feed the film, cam means having sharp fall-away portions, means to drive said cam means, a lever having a follower co-operating with said cam means, said lever being operatively connected to said tooth-member, for imparting to said member its movements to engage the tooth with and withdraw the tooth from the film, spring means for suddenly rocking said lever and follower when said fall away portions reach the follower and in time relationship to the movement of the said means for travelling the tooth member along the track, so that said film engaging and disengaging movements of the tooth take place rapidly in a substantially straight path without displacing the film, an additional film-registering tooth member for holding the film in position when the film driving tooth is disengaged from the film, such additional tooth member being arranged to receive its insertion and withdrawal movements also by spring action through the medium of the said lever in timed relationship with the withdrawal and insertion of the film-driving tooth.

16. An intermittent film-feed mechanism according to claim 15, in which the registering tooth is associated with means whereby it can be held out of engagement with the film whilst the film driving tooth is also out of engagement with the film for the purpose of facilitating loading of the film into the camera, a toothed sector operated by said lever for driving said film-shifting tooth member, said film-registering tooth being connected to the tooth sector through a lever whose fulcrum can be normally shifted to maintain the registering tooth out of engagement with the film.

ALBERT GEORGE HILLMAN.